(12) United States Patent
Tempel et al.

(10) Patent No.: US 11,739,859 B2
(45) Date of Patent: Aug. 29, 2023

(54) VALVE ACTUATING DEVICE

(71) Applicant: Neoperl GmbH, Mullheim (DE)

(72) Inventors: Marc Tempel, Freiburg (DE); Yichao Bian, Mullheim-Hugelheim (DE)

(73) Assignee: Neoperl GmbH, Müllheim (DE)

( * ) Notice: Subject to any disclaimer, the term of this patent is extended or adjusted under 35 U.S.C. 154(b) by 0 days.

(21) Appl. No.: 17/049,153

(22) PCT Filed: Jan. 11, 2019

(86) PCT No.: PCT/EP2019/050690
§ 371 (c)(1),
(2) Date: Oct. 20, 2020

(87) PCT Pub. No.: WO2019/211007
PCT Pub. Date: Nov. 7, 2019

(65) Prior Publication Data
US 2021/0239236 A1    Aug. 5, 2021

(30) Foreign Application Priority Data

Apr. 30, 2018    (DE) .......................... 202018102401.9

(51) Int. Cl.
*F16K 31/385*    (2006.01)
*F16K 7/17*    (2006.01)
*F16K 31/524*    (2006.01)

(52) U.S. Cl.
CPC ............ *F16K 31/3855* (2013.01); *F16K 7/17* (2013.01); *F16K 31/52408* (2013.01)

(58) Field of Classification Search
USPC ....................................................... 137/801
See application file for complete search history.

(56) References Cited

U.S. PATENT DOCUMENTS

| 3,880,190 | A | 4/1975 | Boss |
| 7,147,207 | B2 | 12/2006 | Jordan et al. |
| 10,208,872 | B2 | 2/2019 | Bian et al. |

FOREIGN PATENT DOCUMENTS

| CN | 1445631 | 10/2003 |
| CN | 1769733 | 5/2006 |
| CN | 103062465 | 4/2013 |
| CN | 203384418 | 1/2014 |
| CN | 203488825 | 3/2014 |
| CN | 206130278 | 4/2017 |
| CN | 206257284 | 6/2017 |
| DE | 102013111998 | 4/2015 |
| DE | 202016001106 | 6/2017 |
| DE | 102016006388 | 8/2017 |
| JP | 2001098596 | 4/2001 |
| JP | 2012145145 | 8/2012 |

OTHER PUBLICATIONS

JP 2012145145 A—Machine Translation (Year: 2012).*

* cited by examiner

*Primary Examiner* — Daphne M Barry
(74) *Attorney, Agent, or Firm* — Volpe Koenig

(57) ABSTRACT

In a valve actuating device (1), a bi-stable mechanism (13), by which an auxiliary valve (7) of a pressure-actuatable main valve (2) can be controlled, is set up in such a way that at least one stop point for an open position of the main valve (2) can be adjusted by a rotational movement of a valve element (10) in order to adjust a manual operating element (11) for the auxiliary valve (7).

14 Claims, 9 Drawing Sheets

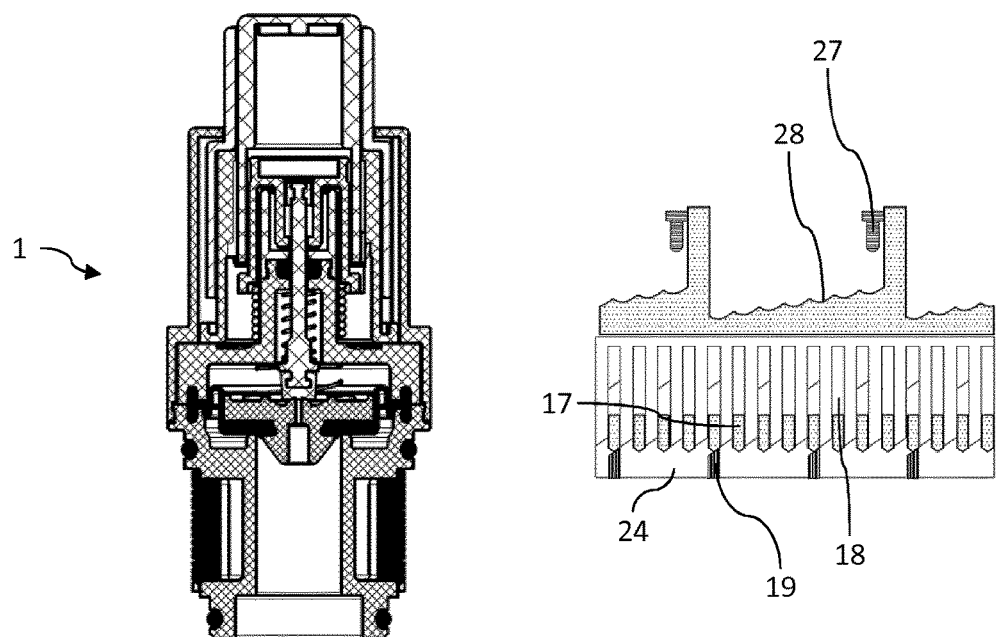
Fig. 10
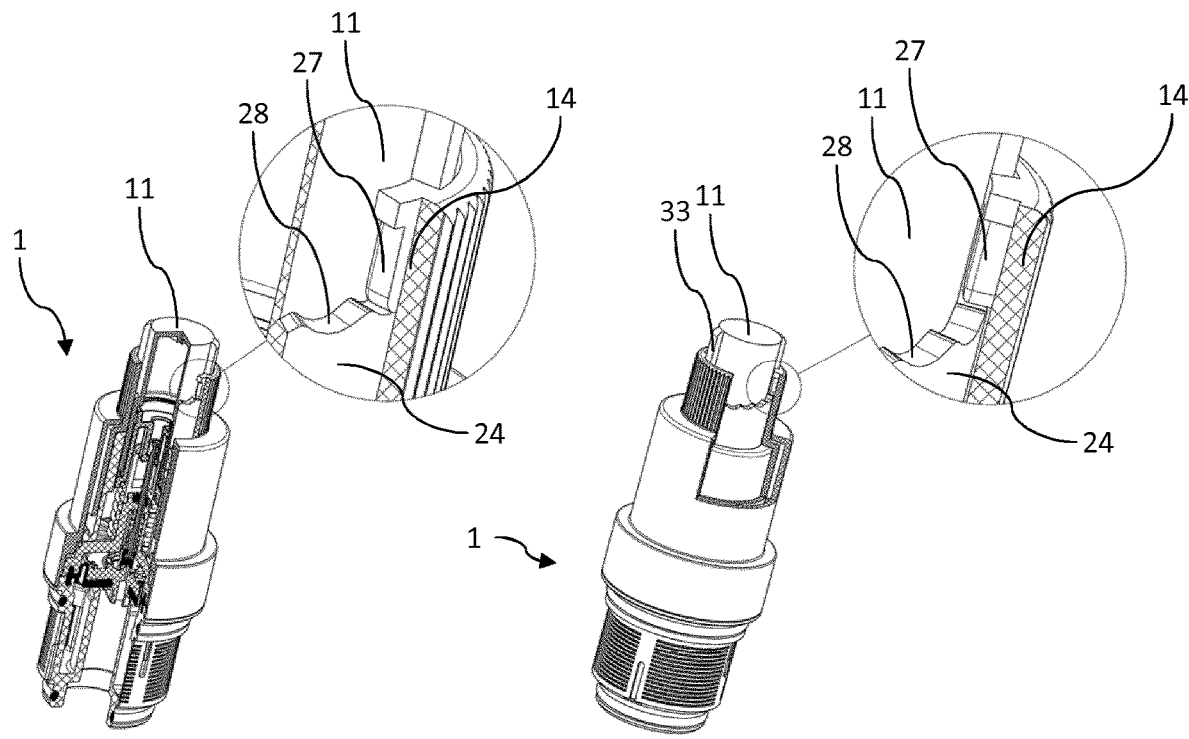
Fig. 11
Fig. 12

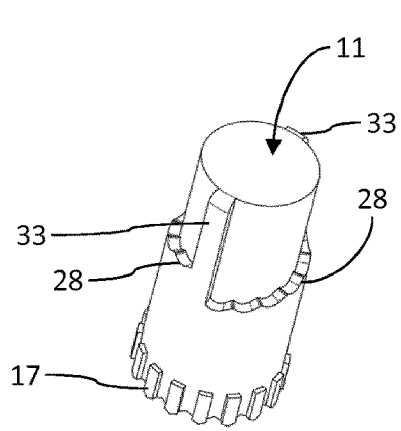
Fig. 13
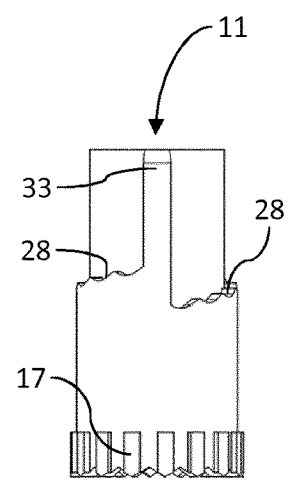
Fig. 14
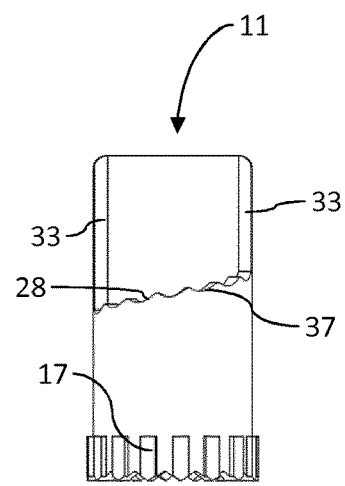
Fig. 15
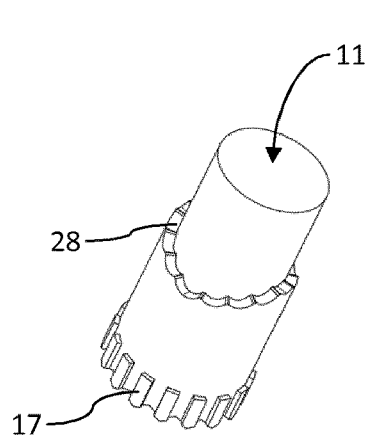
Fig. 16
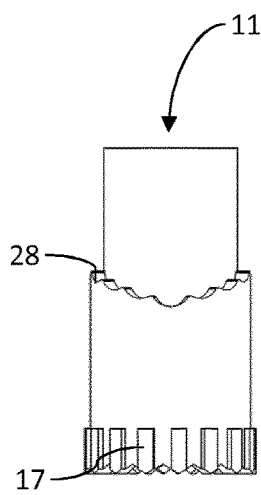
Fig. 17
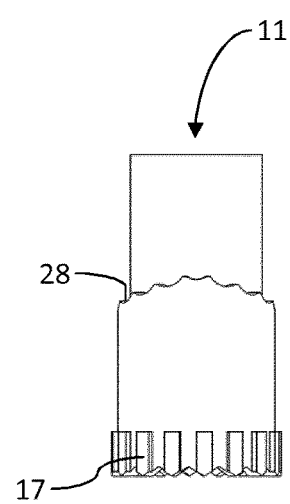
Fig. 18
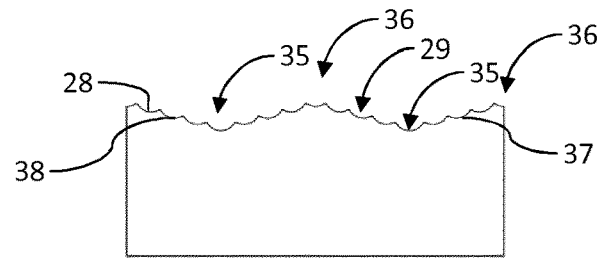
Fig. 19
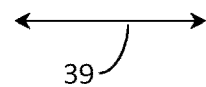

VALVE ACTUATING DEVICE

TECHNICAL FIELD

The invention relates to a valve actuating device having a main valve and an auxiliary valve, wherein the main valve has a switching membrane which can be adjusted between an open position and a closed position by the auxiliary valve, wherein the auxiliary valve can be actuated via a bi-stable mechanism by a manual operating element which can be moved in an actuating direction.

BACKGROUND

Valve actuating devices of this type are known and are used, for example, to achieve a soft switching behaviour and/or switching with low actuating forces. For this purpose, an operating pressure of the medium to be switched is generally used, in order—via the auxiliary valve—to load or release the switching membrane such that the closed position or the open position is assumed.

It has already been proposed that, for this purpose, the manual operating element is equipped with an additional degree of freedom of movement in order to be able to set the open position. It can be achieved in this way that, in the open position, different through-flow openings are formed on the main valve.

SUMMARY

The invention is based on the object of providing a valve actuating device with improved usage properties.

To achieve this object, one or more features according to the invention are provided. Thus, in particular, to achieve this object according to the invention in the case of a valve actuating device of the type described in the introduction, it is provided that a switching position of the bi-stable mechanism that defines the open position of the bi-stable mechanism can be set by a rotational movement about the actuating direction of an adjustment part relative to the manual operating element. This provides an additional adjustment option which can be performed independently of the manual operating element. This has the advantage, for example, that the manual operating element does not change its spatial orientation when the adjustment part is rotated about the actuating direction. Thus, for example, a label can be formed on the manual operating element that remains in a readable orientation in all settings.

The invention offers the further advantage that a flow rate in the open position can be varied. This is advantageous in particular when the valve actuating device is operated in conjunction with an instantaneous water heater with constant heating power or with restricted heating power. It is then possible specifically, for example, depending on the time of year, to select between a low flow rate which leads to a desired usage temperature at a constant heating power and at a low inlet temperature—for example in winter—and a high flow rate per unit of time which can lead to the same or nearly the same usage temperature at the same heating power and at a higher inlet temperature—for example in summer.

An advantageous application of a valve actuating device according to the invention, in particular as described above and/or as claimed in one of the claims directed at a valve actuating device, can thus consist in that a flow rate is matched to a temperature of an inflowing water flow by the adjustment part, such that an outlet temperature of a preferably electric instantaneous water heater which is connected in series, in particular downstream, of the valve actuating device creates a desired outlet temperature. It is thus not necessary to regulate a heating power of the instantaneous water heater.

In one configuration of the invention, the adjustment part may be of a sleeve-like form. It is advantageous here that a space-saving configuration is possible, since the adjustment part is formed around the manual operating element.

As an alternative or in addition, the adjustment part may accommodate the manual operating element. This also enables a space-saving configuration and, at the same time, guidance of the manual operating element in the adjustment part.

In one configuration of the invention, the adjustment part may be arranged rotatably on a housing which accommodates at least the bi-stable mechanism. This describes a simple way of being able to reliably perform the rotational movement. In particular, accidental adjustments of the manual operating element during an adjustment of the adjustment part can thus be prevented.

In one configuration of the invention, the manual operating element may be arranged such that it is linearly displaceable in the actuating direction. This makes it possible to easily actuate the auxiliary valve in order to drive the main valve.

Overall, the invention can be advantageously used in such valve arrangements in which the auxiliary valve drives a relief opening which may be formed for example in the switching membrane, wherein the relief opening relieves a pressure chamber bounded by the switching membrane. In this way, a build-up of pressure and a reduction of pressure downstream of the switching membrane can be easily realized, which leads to the closing (in the case of a build-up of pressure) or opening (in the case of a reduction of pressure) of the main valve. Here, this pressure chamber can be fed from a feed line of the main valve.

In one configuration of the invention, the adjustment part and the manual operating element may be movable independently of one another. This makes an easy and understandable separation of the different operating functionalities possible.

For example, the manual operating element may be guided in a rotationally fixed manner. This makes it possible to offer a text-based or graphic printing or marking in a fixed orientation for the viewer, with the result that the label or the printed symbols can be easily identified.

In one configuration of the invention, the bi-stable mechanism may have a pairing of a stop element and a stop line which provides different stop positions, which interact to define the open position. In this way, an adjustable stop by means of which the already mentioned open position of the bi-stable mechanism can be set can be easily provided.

For example, a relative position of the stop element on the stop line can be adjusted by the adjustment part. This makes it possible to easily transform the adjustment movement on the adjustment part into a setting of the associated switching position.

For example, the stop line may be formed without interruptions. A simple gliding of the stop on the stop line can thus be achieved. This is favourable, for example, when the switching position should be set in the open position of the bi-stable mechanism.

As an alternative or in addition, the stop line may be of a stepped form. It is advantageous in this case that an adjustment of the switching position of its own accord as a result of shocks or the like can be avoided and/or that an adjustment of the stop along the stop line can be haptically perceived.

In one configuration of the invention, at least one rotational stop for an adjustment direction of the relative position may be formed. It is advantageous in this case that, at least in an adjustment direction, it can be indicated in a manner perceptible to the user that a further adjustment of the relative position is not possible. It is particularly favorable when the rotational stop is formed for the purpose of delimiting a stop line, for example the already mentioned stop line, in the adjustment direction of the relative position. A correspondence between an end position of the adjustment direction and an end position of the stop on the stop line can be achieved in this way. It is particularly favourable when at least two rotational stops are formed. The adjustment direction can be delimited on either side in this way. An upper and a lower position of the open position of the bi-stable mechanism can thus be defined.

As an alternative, the stop line may be formed in an encircling manner. It is advantageous here that rotational stops can be dispensed with. Here, the stop lines may define at least one point of reversal and/or one upper point of reversal. A lower and/or an upper position of the open position can be easily defined. As an alternative or in addition, it can be achieved as a result of this that the stop line has at least one rising portion and/or one falling portion. At least one portion of the falling type preferably follows the at least one rising portion, and vice versa.

In one configuration of the invention, the bi-stable mechanism may be in the form of a ballpoint pen mechanism. This constitutes an implementation of a bi-stable mechanism that is particularly easy to handle.

Here in particular, a position of a stop, for example the already mentioned stop, for a working movement of the ballpoint pen mechanism can be set by the adjustment part. This stop may preferably define the open position. It is favourable here when the switching position can be varied in a simple manner by setting the position of the stop.

BRIEF DESCRIPTION OF THE DRAWINGS

The invention will now be described in more detail with reference to exemplary embodiments, without however being limited to said exemplary embodiments. Further exemplary embodiments become apparent from the combination of the features of individual or several claims with one another and/or with individual or several features of the exemplary embodiments.

In the drawing:

FIG. 10 shows a representation analogous to FIGS. 6 to 9, in which the main valve is closed and the manual operating element is pressed below the lower switching position, FIG. 11 shows a partially cut-open representation with respect to FIG. 1, FIG. 12 shows a further partially cut-open representation with respect to FIG. 1, FIG. 13 shows a three-dimensional oblique view of the manual operating element of the valve actuating device according to FIG. 1, FIG. 14 shows a first side view of the manual operating element according to FIG. 13, FIG. 15 shows a second side view, represented from an accommodating position which has been rotated by 90 degrees, of the manual operating element according to FIG. 11, FIG. 16 shows a further manual operating element in a three-dimensional oblique view that can be used instead of the manual operating element according to FIG. 13 in the valve actuating device according to FIG. 1, FIG. 17 shows a side view with respect to FIG. 16 that corresponds to FIG. 14, FIG. 18 shows a side view with respect to FIG. 16 that corresponds to FIG. 15, and FIG. 19 shows the unwound stop line of the manual operating element according to FIG. 16.

DETAILED DESCRIPTION

First of all, FIGS. 1 to 4, 11 and 12 will be described together.

Figure 1:
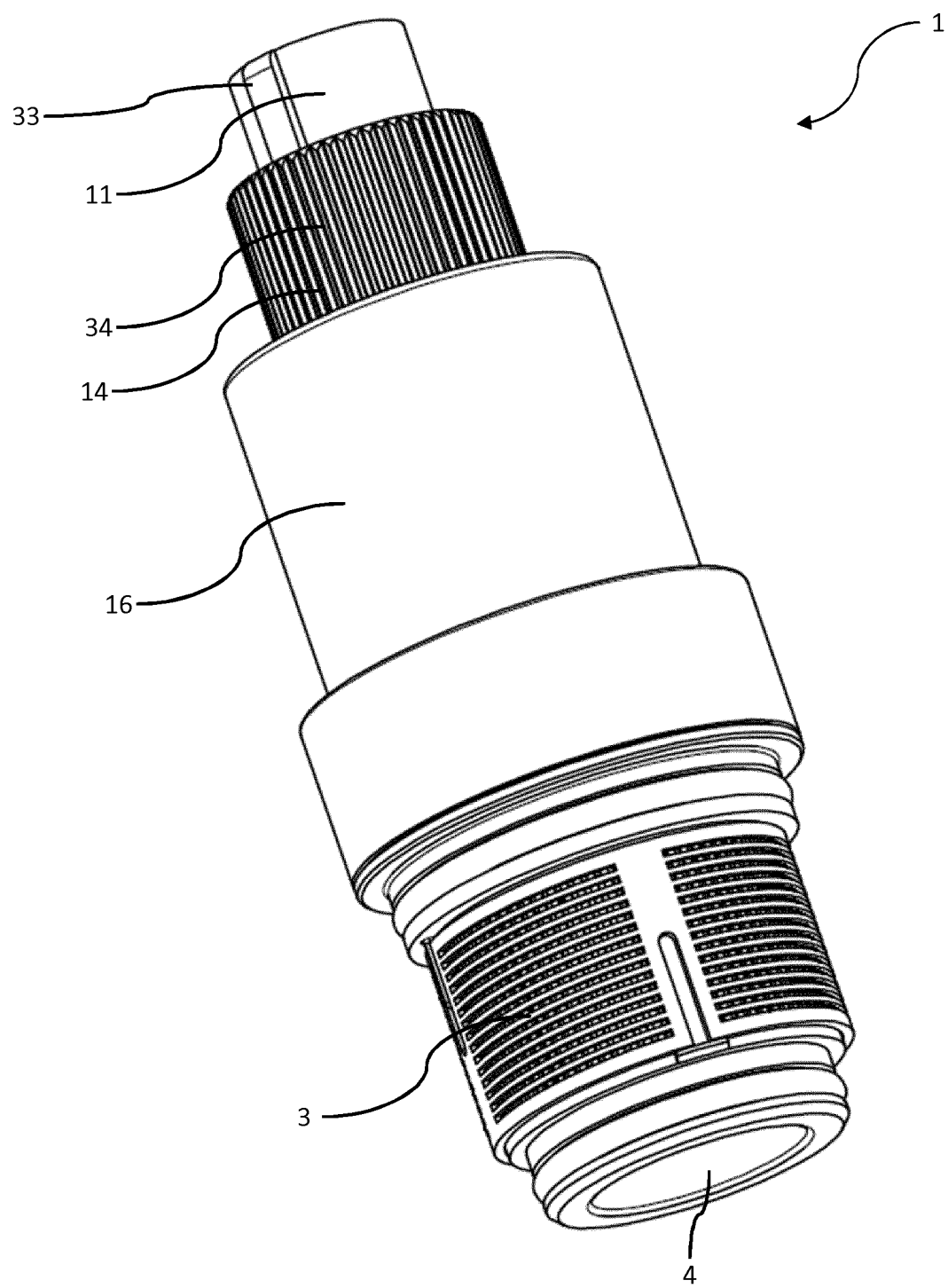
FIG. 1 shows a valve actuating device according to the invention in a three-dimensional oblique view.

Here, FIG. 1 shows the three-dimensional outer view of a valve actuating device denoted as a whole by 1.

Figure 2:
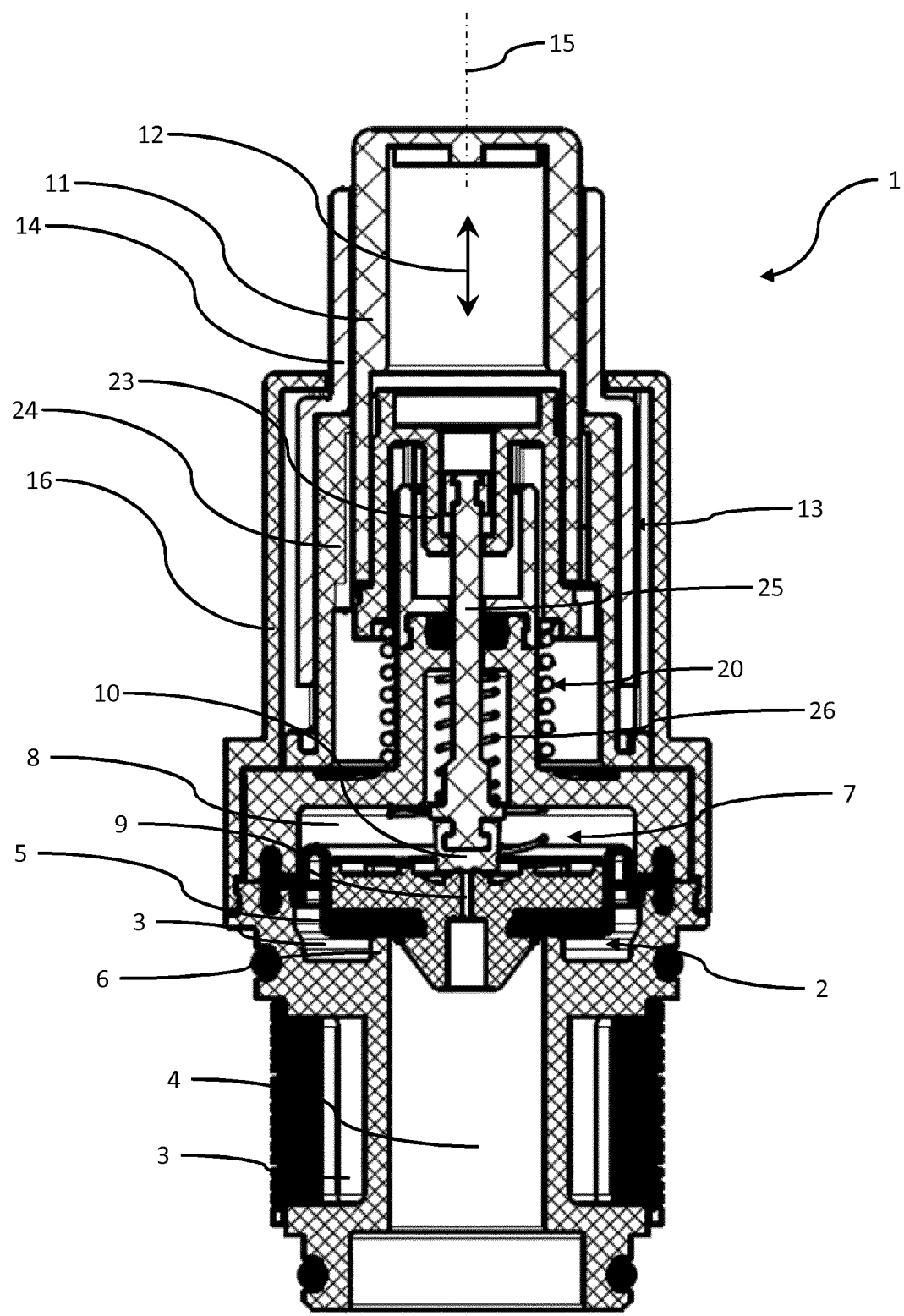
FIG. 2 shows the valve actuating device according to FIG. 1 in a longitudinal sectional representation.

In the sectional representation according to FIG. 2, it can be seen that the valve actuating device 1 has a main valve 2, by which a through-flow from an inflow 3 to an outflow 4 can be interrupted or enabled.

For this purpose, in a manner known per se, the main valve 2 has a switching membrane 5 by which a valve seat 6 can be closed and opened up.

To drive the main valve 2, an auxiliary valve 7 is formed.

In a manner likewise known per se, the switching membrane 5 terminates a pressure chamber 8 which is connected via a relief opening 9 to the outflow 4.

The auxiliary valve 7 has a valve element 10, by which the relief opening 9 can be opened and closed.

If the relief opening 9 is open, the pressure chamber 8 is evacuated, and the switching membrane 5 moves away from the valve seat 6 by virtue of the pressure in the inflow 3.

If the relief opening 9 is closed, a pressure builds up in the pressure chamber 8 since the pressure chamber 8 can be filled, for example from the inflow 3, in a manner not illustrated further.

This has the effect that the switching membrane 5 is pressed against the valve seat 6.

In order to actuate the auxiliary valve 7, a manual operating element 11 is formed which is arranged such that it is linearly displaceable in an actuating direction 12.

Formed in an operative connection between the manual operating element 11 and the auxiliary valve 7 is a bi-stable mechanism 13, which defines the open position and the closed position of the auxiliary valve 7 and thus the open position and the closed position of the switching membrane 5 in a manner to be described in more detail below.

The valve actuating device 1 also has an adjustment part 14, which can be rotated about an axis of rotation 15 which is aligned parallel to the actuating direction 12 relative to the manual operating element 11.

In a manner to be described in more detail below, the adjustment part 14 serves to vary the position of the open position of the auxiliary valve 7 and thus of the switching membrane 5 of the main valve 2.

Here, the adjustment part 14 is of a sleeve-like configuration and surrounds the manual operating element 11 in the circumferential direction on all sides and accommodates said manual operating element.

In order to ensure the rotatability, the adjustment part 14 is arranged rotatably on a housing part 16 which accommodates the main valve 2, the auxiliary valve 7 and the bi-stable mechanism 13 in such a manner that a housing is formed.

The manual operating element 11 and the adjustment part 14 are thus arranged such that they are movable independently of one another.

Figure 3:
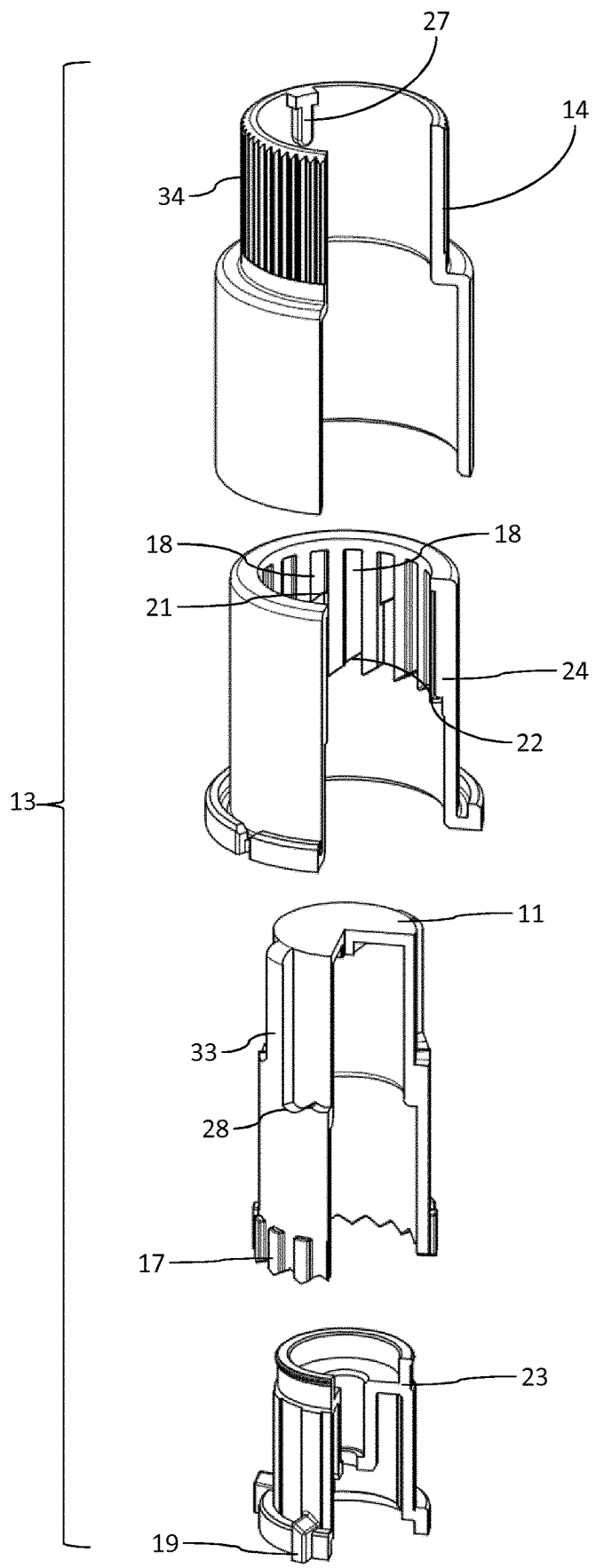
FIG. 3 shows an exploded representation with partially cut-open constituent parts of the bi-stable mechanism of the valve actuating device according to FIG. 1.
Figure 4:
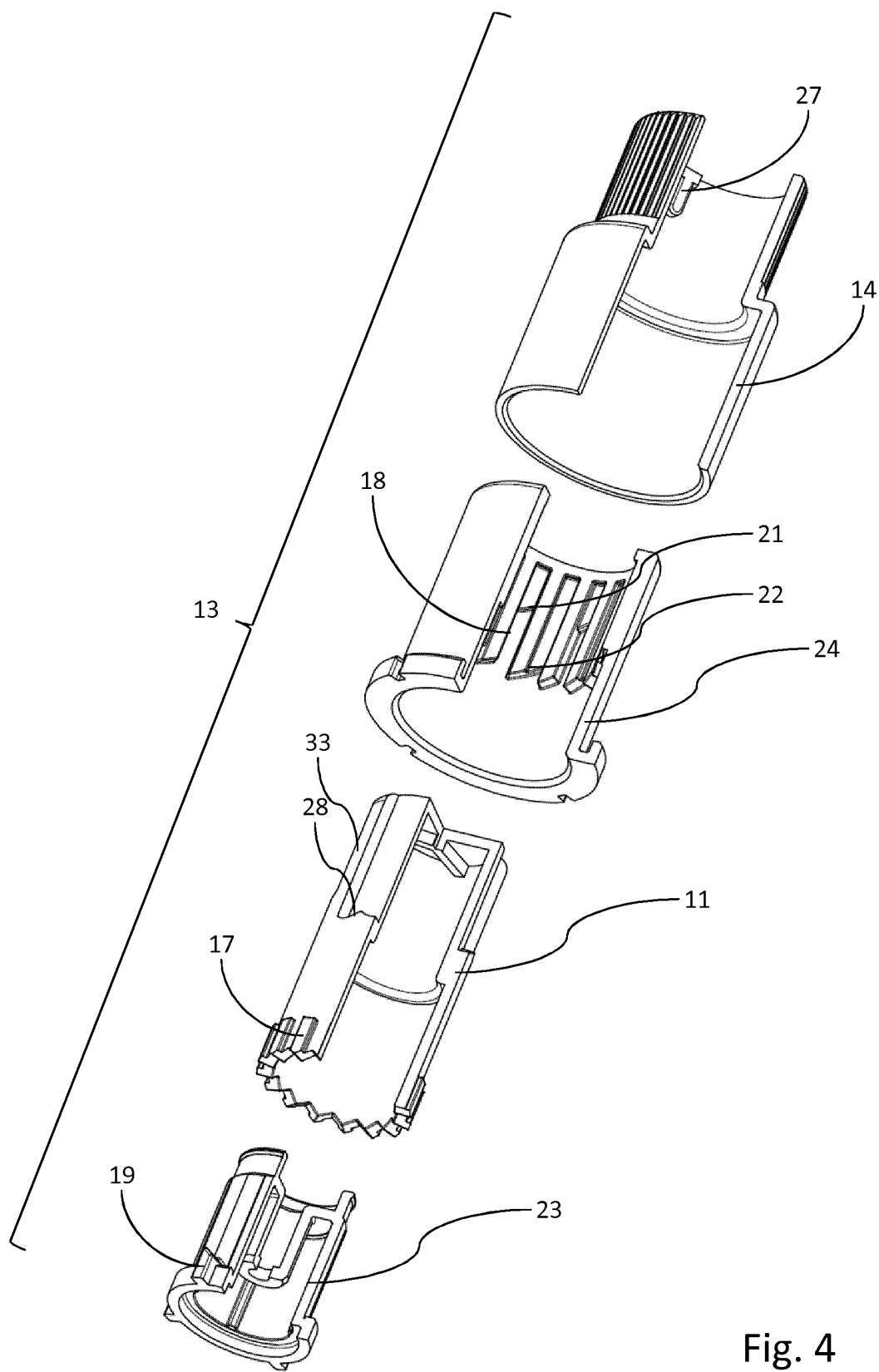
FIG. 4 shows a representation analogous to FIG. 3 from a different viewer position.

The bi-stable mechanism 13 is illustrated in more detail in FIGS. 3 and 4. In the exemplary embodiment, the bi-stable mechanism 13 is in the form of a ballpoint pen mechanism known per se. However, other bi-stable mechanisms can also be used.

For this purpose, the bi-stable mechanism 13 has guide projections 17 which run in guide tracks 18.

Upon actuation of the manual operating element 11, these guide projections 17 displace control projections 19, which likewise run in the guide tracks 18, until the control projections 19 leave the guide track 18.

A bevel of the guide projections 17 on the one hand and between two adjacent guide tracks 18 on the other hand leads in a manner known per se to a restoring spring 20 forcing the control projections 19 in each case into the adjacent guide track 18 when the guide projections 17 are relieved of load.

Formed in each guide track 18 is a stop 21 which defines an upper position of the bi-stable mechanism 13, or a stop 22 which defines a lower position of the bi-stable mechanism 13.

The stops 21, 22 are dimensioned here such that they delimit the movement of the control projections 19 but in contrast not the movement of the guide projections 17.

The guide projections 17 are formed on the already mentioned manual operating element 11 here. The control projections 19 are formed on an inner part 23 which is arranged rotatably in the manual operating element 11.

The manual operating element 11 is arranged in a sleeve-like intermediate part 24 which forms the guide tracks 18 on its inner side.

It can be seen in FIG. 2 that the inner part 23 is in operative connection with a plunger 25 of the auxiliary valve 7, which plunger bears the valve element 10 of the auxiliary valve 7 on its end facing away from the inner part 23.

As can be seen in FIG. 2, the inner part 23 can only subject the plunger 25 to tensile loading. A spring element 26 entrains the plunger 25 when the inner part 23 is moved downward, until the valve element 10 rests.

In this way, it is achieved that the upper stops 21 define the upper position of the valve element 10, while the stops 22 establish the lower position of the valve element 10.

The freedom mentioned between the inner part 23 and the plunger 25 leads to the inner part 23 being able to be moved deeper during a switching process than would be possible for the plunger 25 in order to initiate a retracting movement.

Formed on the inside of the adjustment part 14 are stop elements 27, which interact with a stop line 28 which is arranged on the outside of the manual operating element 11.

Since the adjustment part 14 is fixed in the axial direction, that is to say in the actuating direction 12, the stop element 27 additionally delimits the movability of the manual operating element 11 and thus also the working stroke of the bi-stable mechanism 13 in the upward direction.

Here, the stop line 28 is divided into a sequence of segments 29, which describe a different axial position in each case. In this way, the movability of the manual operating element 11 is delimited differently depending on the rotational position relative to the stop element 27.

A rotation of the adjustment part 14 thus leads to the movability of the manual operating element 11 being delimited upwardly to a more or less pronounced extent.

Figure 5:
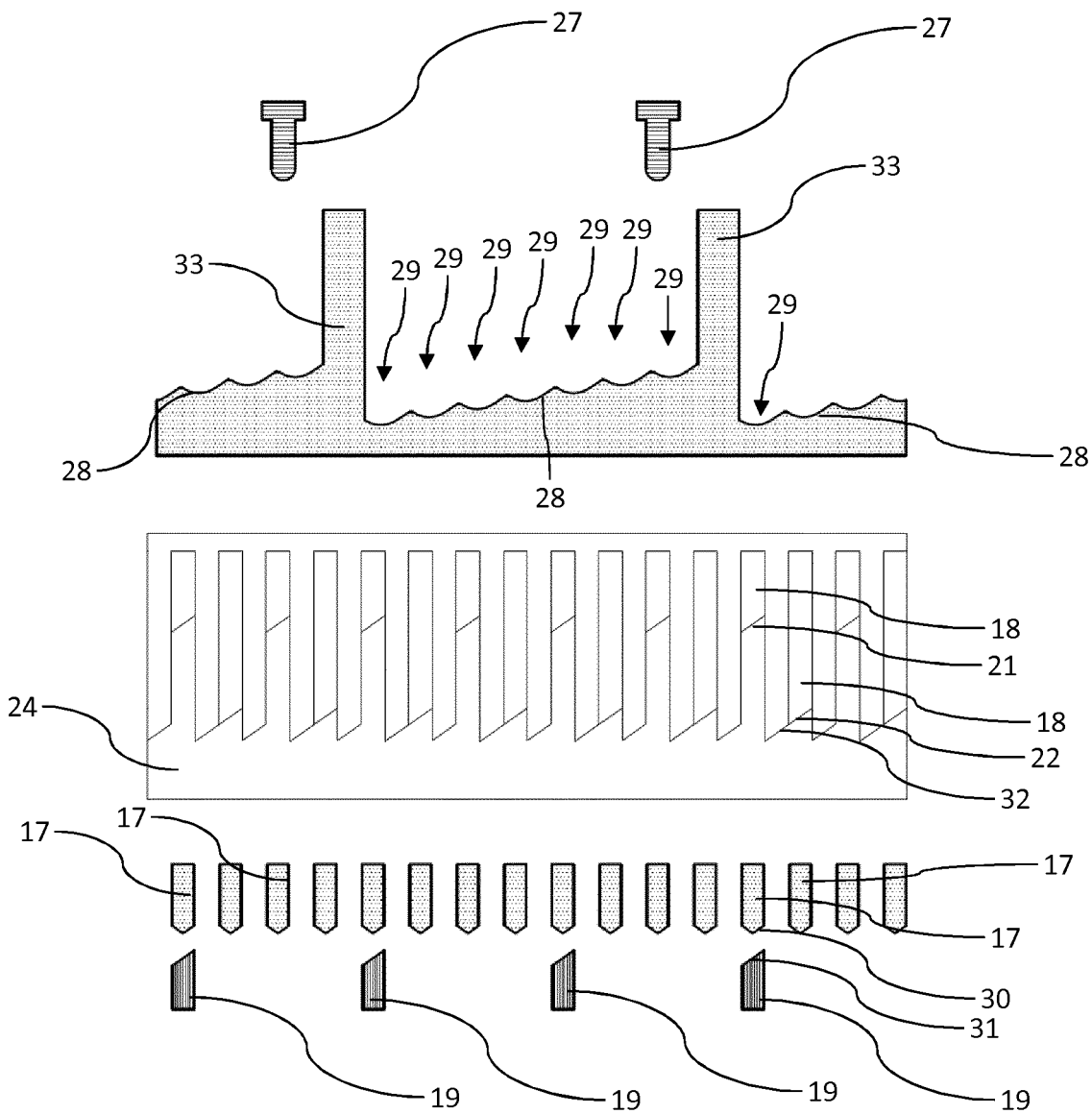
FIG. 5 shows a basic diagram for explaining a switching behaviour of the bi-stable mechanism according to FIGS. 3 and 4.

FIG. 5 shows, from top to bottom, the unwound position of the stop elements 27, below which is the unwound form on the manual operating element 11, below which is the unwound inner form on the intermediate part 24 with the guide tracks 18, below which is the unwound position of the guide projections 17 which are formed on the outside below the stop line 28 on the manual operating element 11, and below which is the unwound position of the control projections 19 on the inner part 23.

It can be seen from FIG. 5 that the guide projections 17 which run in the guide tracks 18 have on their front end a bevel 30 which interacts with a corresponding bevel 31 on the control projections 19, which are likewise guided in the guide tracks 18, in such a manner that whenever a control projection 19 is forced out of the guide track 18, said control projection 19 is displaced slightly to the right. Upon a return of the control projection 19, the bevel 31 thereof comes into contact with a bevel 32 between two guide tracks 18, with the result that the control projection 19 is rotated about an angular increment and guided into the adjacent guide track 18.

It can be seen from FIG. 5 that the guide tracks 18 alternately form stops 21, 22 of different heights. These stops are formed for the control projections 19, with the result that the control projections 19 in the guide tracks 18 rest either on the upper stop 21 and on the lower stop 22.

It can also be seen in FIG. 5 that the stop line 28 is of a stepped form without interruptions, wherein the individual steps define a segment 29 in each case.

It can be seen that each step which is defined by a segment 29 defines another point of contact with the stop element 27. Since the stop element 27 is formed on the adjustment part 14, which is immovable in the axial direction, the stop element 27 remains spatially fixed. In contrast to this, the stop line 28 together with the guide projections 17 is guided upward on the manual operating element 11 when the manual operating element 11 is relieved of load. Here, the stop line 28 is arranged such that the plurality of segments 29 or even all segments 29 except for the lowermost segment 29 come into contact with the stop element 27 before the control projection 19 makes contact with the upper stop 21.

In this way, the movability of the control projection 19 and thus of the inner part 23 is yet further reduced with respect to the adjustment path which is formed by the stops 21 and 22.

In this way, the open position of the valve can be further enlarged or reduced by the relative position of the stop element 27 on the stop line 28.

FIGS. 6 to 10 show this effect.

Figure 6:
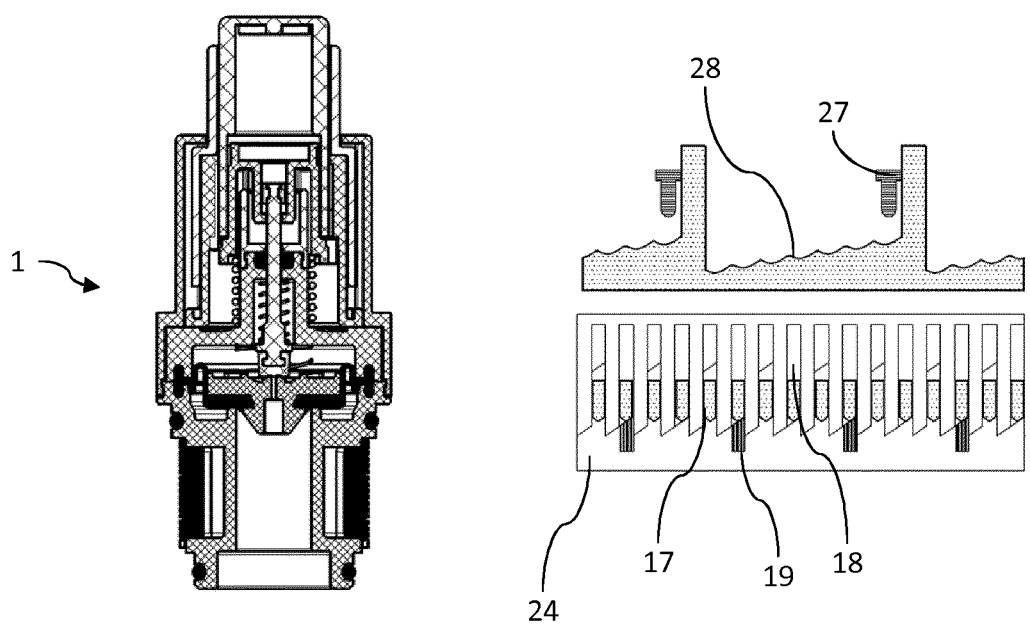
FIG. 6 shows a representation according to FIG. 2 with a closed main valve and pressed-down manual operating element in the lower switching position of the bi-stable mechanism.

Here, FIG. 6 shows the position in which the control projections 19 rest on the lower stop 22.

The sectional representation depicted next to this, reference being made to FIG. 2 for the more detailed explanation thereof, shows the corresponding position of the valve element 10. This closes the relief opening 9, with the result that—in the way already described—the switching membrane 5 is pressed against the valve seat 6. The main valve 2 is thus closed.

It can be seen that the stop elements 27 here are arranged above and spaced apart from the stop line 28, such that there is no further delimitation here.

If now the manual operating element 11 is pressed downward, each of the control projections 19 passes into the respectively adjacent guide track 18, which now contains the upper stop 21. This is shown by way of example in FIG. 7. In this Figure, the stop element 27 is positioned such that it is arranged in the segment 29 which enables the furthest upwardly situated position of the manual operating element 11.

The valve element 10 is accordingly moved away from the relief opening 9, with the result that the pressure chamber 8 is relieved and the main valve 2 is open.

Figure 7:
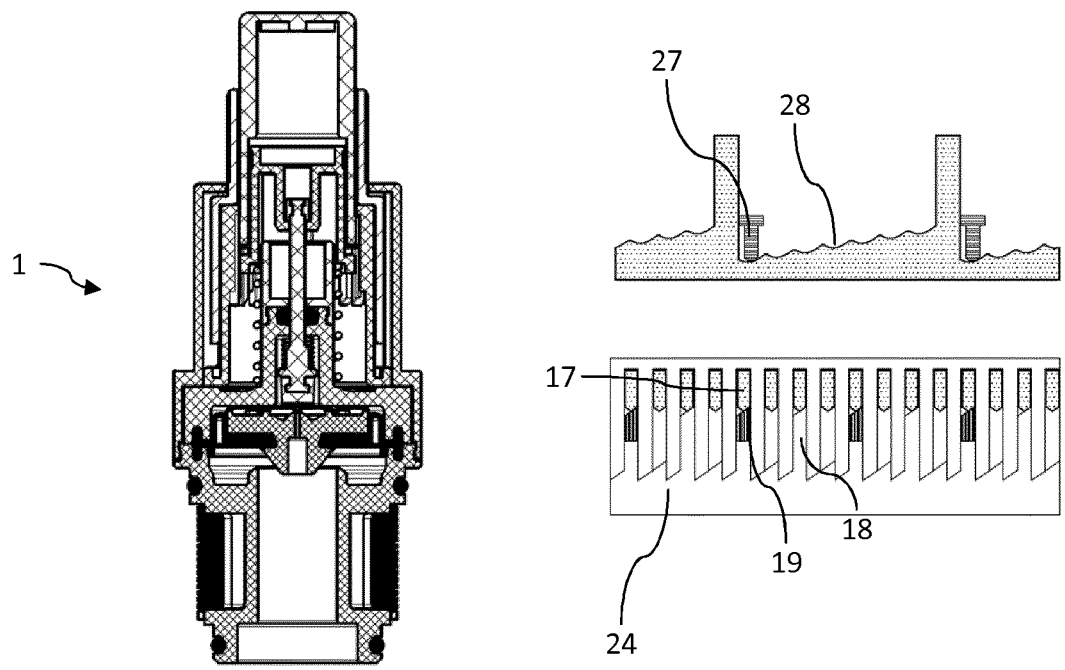
FIG. 7 shows the valve actuating device according to FIG. 1 with an open main valve and manual operating element in an upper position and with the associated switching position of the bi-stable mechanism.
Figure 8:
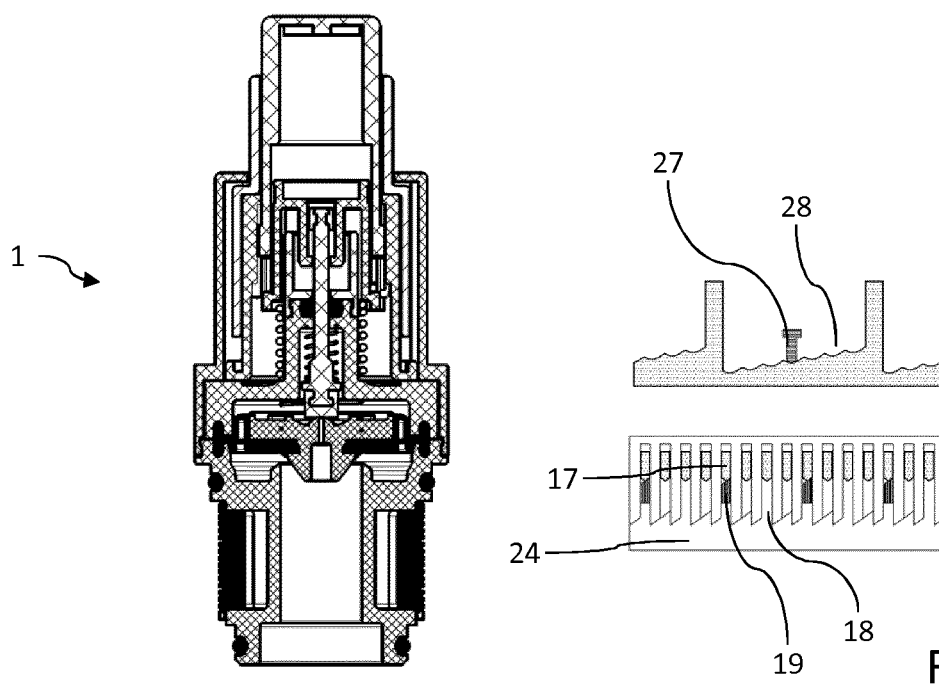
FIG. 8 shows a representation analogous to FIGS. 6 and 7, in which the main valve is open and the switching position for the open position is set to an average value.

If now—either after intermediate switching processes of the bi-stable mechanism 13 or directly in the position of FIG. 7—the adjustment part 14 is rotated such that the stop element 27 moves along the stop line 28, the manual operating element 11 assumes a position which is somewhat deeper than in FIG. 7.

In this position, the switching membrane 5 is not yet located on the valve seat 6 but the relief opening 9 is closed by the valve element 10. A pressure thus builds up in the pressure chamber 8, which leads to the switching membrane 5 moving slightly downward. In this situation, the relief opening 9 is opened up again such that the pressure decreases until the switching membrane presses the relief opening 9 against the valve element 10 again, as a result of which the pressure chamber 8 is closed.

In this way, an intermediate state of equilibrium is set in which the valve seat 6 is somewhat less open than was the case in FIG. 7. The clear opening cross section of the valve seat 6 is thus reduced in this position compared to FIG. 7.

Figure 9:
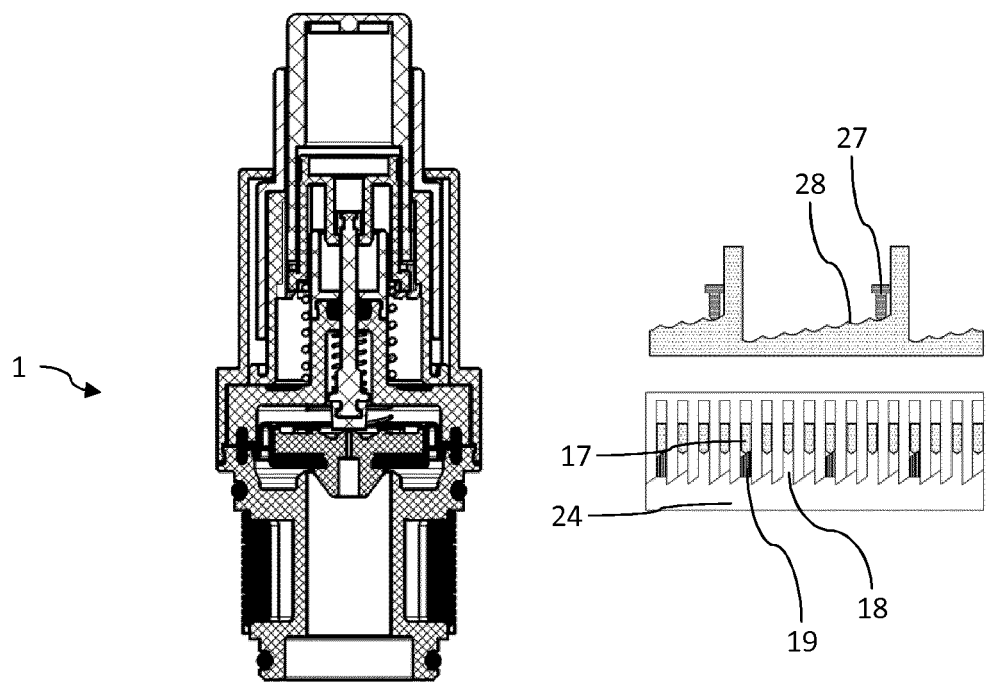
FIG. 9 shows a representation analogous to FIG. 8, in which the open position of the bi-stable mechanism is set to an upper value.

If now the adjustment part 14 is adjusted further until the stop element 27 is arranged on the stop line 28 in the position according to FIG. 9, the manual operating element 11 is forced into the furthest downwardly situated position. Here, too, the spring element 26 leads to the plunger 25 following it, with the result that the switching membrane 5 closes the valve seat 6 yet further. Thus, a further intermediate state of equilibrium can be formed, or even a point is reached at which the valve seat 6 is completely closed.

The stop line 28 is bounded at each of its ends by a rotational stop 33 which interacts with the stop element 27. In addition, the rotational stop 33 forms a guide means which guides the manual operating element 11 in a rotationally fixed manner.

FIG. 10 shows the already described switching over from one guide track 18 to the adjacent guide track 18.

It can be seen that the manual operating element 11 has already been pressed, with the result that the control projection 19 is forced out of the guide track 18.

Since the inner part 23 is spring-loaded, this leads to the control projections 19 on the bevels 30 of the guide projections 17 being forced into the bevels 32 between two adjacent guide tracks and from there, after a relief of the load on the manual operating element 11 and thus a return movement of the guide projections 17, upwardly into the adjacent guide track 18.

The embodiment shown of the stop line 28 as a wavy line serves to haptically determine a displacement of the stop element 27 on the stop line 28 from the outside. Other configurations of the stop line 28, for example as an interrupted line or as a smooth, continuous planar line with a constant upward slope or other forms, can also be realized.

For example, in one exemplary embodiment, the stop line 28 can be formed on the rotatable adjustment part 14 and the stop element 27 can be formed on the stationary but pressure-actuable manual operating element 11.

A grip region 34 is formed on the outside of the adjustment part 14, preferably in an encircling manner. The adjustment part 14 can thus be gripped well.

FIGS. 13 to 15 show further views of the manual operating element 11 from FIGS. 1 to 12.

The manual operating element 11 has two rotational stops 33 which are formed on opposite sides. These rotational stops 33 delimit the adjustment movement of the adjustment part 14 in both end positions of the adjustment direction 39.

The rotational stops 33 thus delimit the stop line 28, which has a rising portion 37, on either side.

Moreover, the explanations given above apply to FIGS. 13 to 15.

FIGS. 16 to 19 show another example of a manual operating element 11, which can be used for example in the embodiment according to FIGS. 1 to 12 instead of the manual operating element 11 shown there.

This manual operating element 11 has an encircling stop line 28 without stops.

This stop line is divided into two rising portions 37 and two falling portions 38 which follow one another and enclose between them lower points of reversal 35 and upper points of reversal 36.

In further exemplary embodiments, other numbers of points of reversal and/or portions, in particular the combination with rotational stops, are realized.

In a valve actuating device 1 according to the invention, it is thus proposed to configure a bi-stable mechanism 13, by means of which an auxiliary valve 7 of a pressure-actuable main valve 2 can be driven, such that at least one stop point for an open position of the main valve 2 is adjusted by a rotational movement of an adjustment part 14 about a manual operating element 11 for the auxiliary valve 7.

LIST OF REFERENCE SIGNS

1 Valve actuating device
2 Main valve
3 Inflow
4 Outflow
5 Switching membrane
6 Valve seat
7 Auxiliary valve
8 Pressure chamber
9 Relief opening
10 Valve element
11 Manual operating element 12 Actuating device
13 Bi-stable mechanism
14 Adjustment part
15 Axis of rotation
16 Housing part
17 Guide projection
18 Guide track
19 Control projection
20 Restoring spring
21 Stop
22 Stop
23 Inner part
24 Intermediate part
25 Plunger
26 Spring element
27 Stop element
28 Stop line
29 Segment
30 Bevel of 17
31 Bevel of 19
32 Bevel between two guide tracks 18
33 Rotational stop
34 Grip region
35 Lower point of reversal
36 Upper point of reversal
37 Rising portion
38 Falling portion
39 Adjustment direction

The invention claimed is:

1. A valve actuating device (1), comprising:
a main valve (2) having a switching membrane (5);
an auxiliary valve (7) configured to adjust the switching membrane between an open position and a closed position;
a bi-stable mechanism (13) having a manual operating element (11) which is movable in an actuating direction (12), the bi-stable mechanism being configured to actuate the auxiliary valve (7), the bi-stable mechanism (13) has a pairing of a stop element (27) and a stop line (28) which provides different stop positions, and which interact to define the open position, and the stop line (28) comprises a sequence of at least three segments (29), each said segment including a positive stop for receiving the stop element (27), and each said segment having a different axial position; and
wherein a switching position of the bi-stable mechanism (13) that defines an open position of the bi-stable mechanism (13) is settable by a rotational movement about the actuating direction (12) of an adjustment part (14) relative to the manual operating element (11).

2. The valve actuating device (1) as claimed in claim 1, the adjustment part (14) is a sleeve-shaped.

3. The valve actuating device (1) as claimed in claim 1, wherein the adjustment part (14) is arranged rotatably on a housing part (16) which accommodates the bi-stable mechanism (13).

4. The valve actuating device (1) as claimed in claim 1, wherein the manual operating element (11) is arranged to be linearly displaceable in the actuating direction (12).

5. The valve actuating device (1) as claimed in claim 1, wherein the adjustment part (14) and the manual operating element (11) are movable independently of one another.

6. The valve actuating device (1) as claimed in claim 1, wherein the manual operating element (11) is guided in a rotationally fixed manner.

7. The valve actuating device (1) as claimed claim 1, wherein a relative position of the stop element (27) on the stop line (28) is adjustable by the adjustment part (14).

8. The valve actuating device (1) as claimed in claim 7, wherein the stop line (28) is formed without interruptions.

9. The valve actuating device (1) as claimed in claim 7, wherein at least one rotational stop (33) for an adjustment direction of the relative position is formed, delimiting the stop line (28) in an adjustment direction (39) of the relative position.

10. The valve actuating device (1) as claimed in claim 1, wherein the stop line (28) describes a portion of a helical line which encircles the actuating direction.

11. The valve actuating device (1) as claimed in claim 1, wherein the bi-stable mechanism (13) comprises a ballpoint pen mechanism, and a position of a stop for a working movement of the ballpoint pen mechanism is settable by the adjustment part (14).

12. The valve actuating device (1) as claimed in claim 1, wherein the adjustment part (14) accommodates the manual operating element (11).

13. The valve actuating device (1) as claimed in claim 7, wherein the segments are arranged in a stepped form.

14. A valve actuating device (1), comprising:
a main valve (2) having a switching membrane (5);
an auxiliary valve (7) configured to adjust the switching membrane between an open position and a closed position;
a bi-stable mechanism (13) having a manual operating element (11) which is movable in an actuating direction (12), the bi-stable mechanism being configured to actuate the auxiliary valve (7), the bi-stable mechanism (13) has a pairing of a stop element (27) and a stop line (28) which provides different stop positions, and which interact to define the open position, the stop line (28) is formed in an encircling manner and defines a lower point of reversal (35), an upper point of reversal (36), at least one rising portion (37), and at least one falling portion (38), and the at least one rising portion comprises a sequence of segments (29), with each said segment having a different axial position; and
wherein a switching position of the bi-stable mechanism (13) that defines an open position of the bi-stable mechanism (13) is settable by a rotational movement about the actuating direction (12) of an adjustment part (14) relative to the manual operating element (11).

* * * * *